(12) United States Patent
Sen et al.

(10) Patent No.: US 12,001,393 B2
(45) Date of Patent: Jun. 4, 2024

(54) DIRECTORY SNAPSHOTS BASED ON DIRECTORY LEVEL INODE VIRTUALIZATION

(71) Applicant: Dell Products L.P., Round Rock, TX (US)

(72) Inventors: Soumyadeep Sen, Summit, NJ (US); Rohit K. Chawla, Scotch Plains, NJ (US); Marc A. De Souter, Wayne, NJ (US); Alexander S. Mathews, Morganville, NJ (US)

(73) Assignee: DELL PRODUCTS L.P., Round Rock, TX (US)

( * ) Notice: Subject to any disclaimer, the term of this patent is extended or adjusted under 35 U.S.C. 154(b) by 315 days.

(21) Appl. No.: 17/538,318

(22) Filed: Nov. 30, 2021

(65) Prior Publication Data

US 2023/0169037 A1 Jun. 1, 2023

(51) Int. Cl.
*G06F 16/11* (2019.01)
*G06F 16/17* (2019.01)

(52) U.S. Cl.
CPC ........ *G06F 16/128* (2019.01); *G06F 16/1734* (2019.01)

(58) Field of Classification Search
CPC ... G06F 16/128; G06F 16/1734; G06F 16/188
See application file for complete search history.

(56) References Cited

U.S. PATENT DOCUMENTS

| | | | |
|---|---|---|---|
| 7,873,619 B1 | 1/2011 | Faibiish et al. | |
| 8,032,498 B1 | 10/2011 | Armangau et al. | |
| 8,095,577 B1 | 1/2012 | Faibiish et al. | |
| 8,412,688 B1 | 4/2013 | Armangau et al. | |
| 8,661,068 B1 | 2/2014 | Seibel et al. | |
| 8,938,425 B1 | 1/2015 | Armangau et al. | |
| 8,943,282 B1 | 1/2015 | Armangau et al. | |
| 8,996,490 B1 * | 3/2015 | Armangau | G06Q 30/02 709/201 |
| 9,135,123 B1 | 9/2015 | Armangau et al. | |

(Continued)

FOREIGN PATENT DOCUMENTS

EP 3477482 A2 10/2018

OTHER PUBLICATIONS

Final Office Action issued by the U.S. Patent Office for U.S. Appl. No. 17/384,260 dated Apr. 27, 2023, 60 pages.

(Continued)

*Primary Examiner* — Robert W Beausoliel, Jr.
*Assistant Examiner* — Susan F Rayyan
(74) *Attorney, Agent, or Firm* — Amin, Turocy & Watson, LLP

(57) ABSTRACT

Described is a technology that facilitates directory level snapshots at any level of a filesystem's namespace. A directory inode mapping file associates a first directory's virtual inode number(s) with real inode number(s). A snapshot of the first directory creates a second directory with a second directory inode mapping file copied from the first directory inode mapping file, thereby sharing the real inode data structure(s) of the first directory. In the event that one of the directories is to be modified, the directory real inode is split to provide a new directory real inode file for the to-be-modified directory, with the modification after the split.

20 Claims, 13 Drawing Sheets

(56) References Cited

U.S. PATENT DOCUMENTS

| | | | |
|---|---|---|---|
| 10,282,099 B1 | 5/2019 | Kushwah et al. | |
| 11,269,817 B2 | 3/2022 | Menezes et al. | |
| 2003/0158588 A1* | 8/2003 | Rizzo | A61N 1/3787 607/54 |
| 2003/0158863 A1* | 8/2003 | Haskin | G06F 11/1435 |
| 2003/0182322 A1* | 9/2003 | Manley | G06F 16/184 |
| 2008/0059541 A1* | 3/2008 | Fachan | G06F 16/174 |
| 2013/0212136 A1* | 8/2013 | Nishida | G06F 16/11 707/830 |
| 2014/0006454 A1 | 1/2014 | Danado et al. | |
| 2015/0012571 A1* | 1/2015 | Powell | G06F 16/188 707/827 |
| 2019/0129621 A1* | 5/2019 | Kushwah | G06F 3/061 |
| 2019/0129810 A1 | 5/2019 | Kushwah et al. | |
| 2019/0205407 A1* | 7/2019 | Ying | H04L 63/102 |
| 2019/0294586 A1 | 9/2019 | Kushwah et al. | |
| 2020/0233751 A1* | 7/2020 | Gupta | G06F 16/9027 |
| 2020/0250049 A1* | 8/2020 | Lee | G06F 11/1471 |
| 2021/0303511 A1* | 9/2021 | Karr | G06F 16/1824 |
| 2021/0349853 A1* | 11/2021 | Duttagupta | G06F 16/162 |
| 2021/0374099 A1* | 12/2021 | Raju | G06F 16/164 |
| 2022/0004461 A1* | 1/2022 | Jain | G06F 11/1469 |
| 2022/0188267 A1* | 6/2022 | Patil | G06F 3/0643 |
| 2023/0028845 A1* | 1/2023 | Chawla | G06F 16/128 |
| 2023/0103474 A1* | 4/2023 | Gunda | G06F 11/1458 711/162 |
| 2023/0118349 A1* | 4/2023 | Mathews | G06F 16/134 707/692 |
| 2023/0121206 A1* | 4/2023 | Rashid | G06F 16/1727 707/613 |
| 2023/0169037 A1* | 6/2023 | Sen | G06F 16/1734 707/830 |

OTHER PUBLICATIONS

Fu et al., "Performance Optimization for Managing Massive Nos. of Small Files in Distributed File System", IEEE Transactions on Parallel And Distributed Systems, vol. 26, No. 12, Dec. 2015, 16 pages.

Final Office Action received for the U.S. Appl. No. 17/382,496 dated Jul. 27, 2023, 41 pages.

Non Final Office Action issued by the U.S. Patent Office for U.S. Appl. No. 17/384,260 dated Nov. 10, 2022, 51 pgs.

Non Final Office Action issued by the U.S. Patent Office for U.S. Appl. No. 17/382,496 dated Nov. 14, 2022, 66 pgs.

Notice of Allowance received for the U.S. Patent Office for U.S. Appl. No. 17/382,496 dated Nov. 1, 2023, 46 pages.

Notice of Allowance received for the U.S. Appl. No. 17/382,496 dated Nov. 1, 2023, 138 pages.

\* cited by examiner

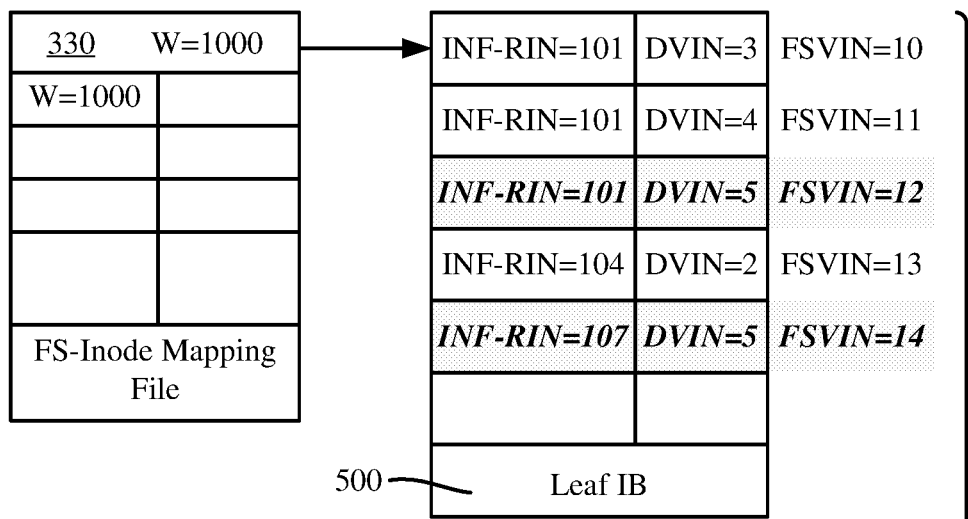
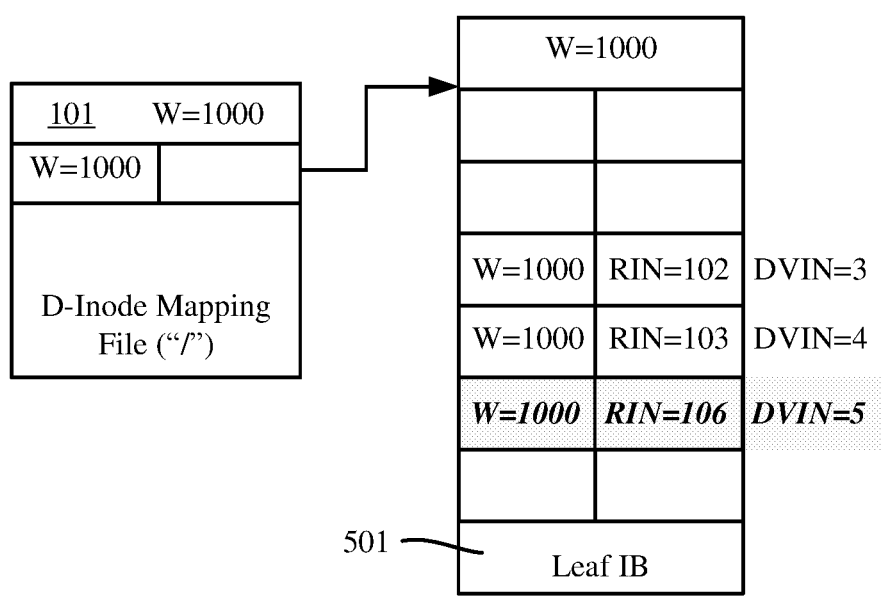
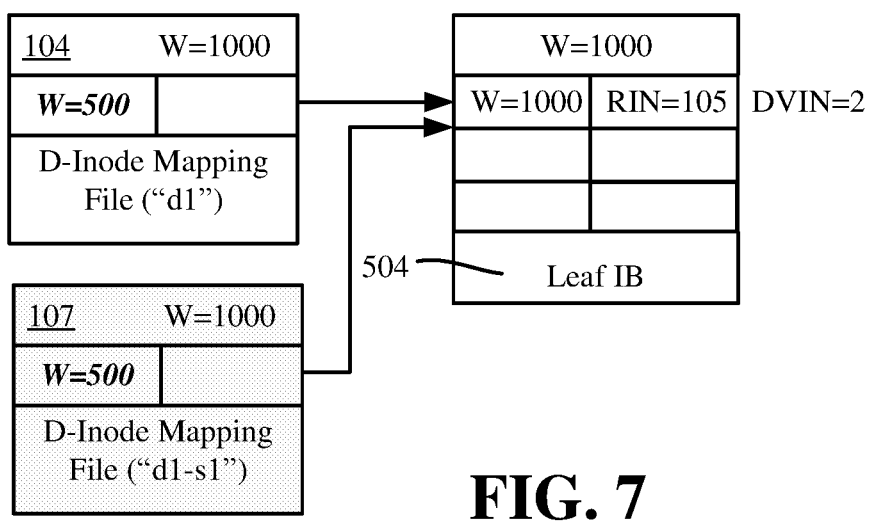
FIG. 7

DIRECTORY SNAPSHOTS BASED ON DIRECTORY LEVEL INODE VIRTUALIZATION

BACKGROUND

Contemporary data storage systems provide for snapshots of a namespace of a filesystem. When a snapshot is created, e.g., based on a primary filesystem, the snapshot shares files with the primary filesystem. In general, in a filesystem that uses inodes (index nodes) to store file metadata that references corresponding files' data, the instances of a shared file, such as via a primary filesystem view and a snapshot view share the same mode and thus index the same shared file data.

Within a single filesystem view, it is desirable to have snapshots of directories, at directory levels below the filesystem/root directory namespace. Existing snapshot solutions depend on backend snapshot technology or other external volume management tools.

BRIEF DESCRIPTION OF THE DRAWINGS

The technology described herein is illustrated by way of example and not limited in the accompanying figures in which like reference numerals indicate similar elements and in which:

FIGS. 7 and 8 are representations of various data structures in a state after a directory snapshot, in accordance with various aspects and implementations of the subject disclosure.

DETAILED DESCRIPTION

Figure 1:
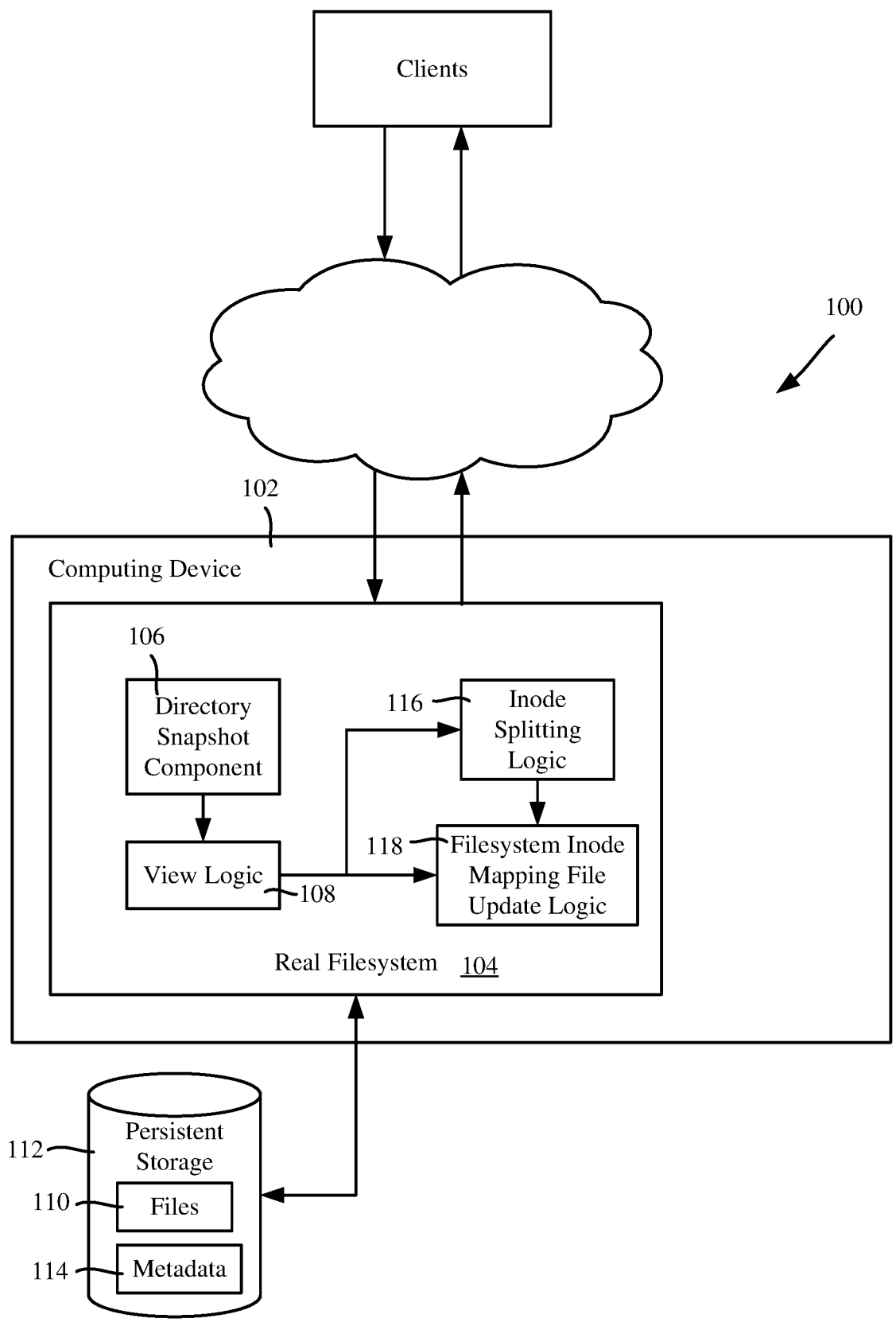
FIG. 1 is a block diagram representation of example components and data—related operations in a data storage system that facilitates directory-level snapshots, in accordance with various aspects and implementations of the subject disclosure.

The technology described herein is generally directed towards directory level snapshots at any level of a filesystem's namespace within the filesystem itself. As described herein, a directory inode mapping file that associates directory virtual inode numbers with the real inode number of a directory real inode data structure (e.g., file) facilitates directory level snapshots.

As will be understood, during a directory snapshot operation within a filesystem, a first (e.g., source) directory inode mapping file is copied to a newly allocated second (e.g., snap) directory inode mapping file, such that both the first and second inode mapping files reference the same directory real inode data structure while providing different directory views. In the event that one of the directories is to be modified for the first time, e.g., via a write operation to add or delete to a directory view, and so on, the directory real inode data structure is split to provide a new directory real inode data structure for the to-be-modified directory, (with the existing directory real inode data structure remaining as is for the unmodified directory). The modification can then take place. Note that when the directory real inode data structure is split, in implementations that use weights, including in the example implementation(s) described herein, the weight is also split.

It should be understood that any of the examples herein are non-limiting. As one example, the technology is described using a UNIX file system, in which virtual inodes map to real inodes to facilitate different views of a real filesystem's directories and the files therein. However, the technology described herein can be applied to other data storages/filesystems. As such, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a system 100 comprising a computing device 102 (which can be a group of devices such as an array of distributed computing nodes) that includes a real filesystem 104 as described herein. Typical such computing devices can comprise operating systems, drivers, network interfaces and so forth, however for purposes of brevity, only components generally relevant to snapshots are shown in FIG. 1.

In general and as described herein, the filesystem 104 supports a directory snapshot component 106, e.g., as a native filesystem component as shown. When invoked, the directory snapshot component 106 produces a copy of a designated directory's snapshotted files as described herein, to provide different views of a directory, e.g., a primary view and a snapshot view, as managed by view logic 108. In general files 110 in persistent storage 112 are shared by having different directory views' virtual inodes reference the same real inode data structure (stored as metadata 114) for each snapshotted file.

When a modification to a directory is received, inode splitting logic 116 splits the directory real inode by allocating a new directory real inode data structure and number for the directory to be modified and remapping the directory virtual inode number (DVIN) entry so that the modified directory inode mapping file will map to the new directory real inode data structure. Other data structures including a global filesystem inode mapping file within the storage are also updated (e.g., via block 118) as described herein to facilitate usage of the new directory real inode data structure.

Figure 2A:
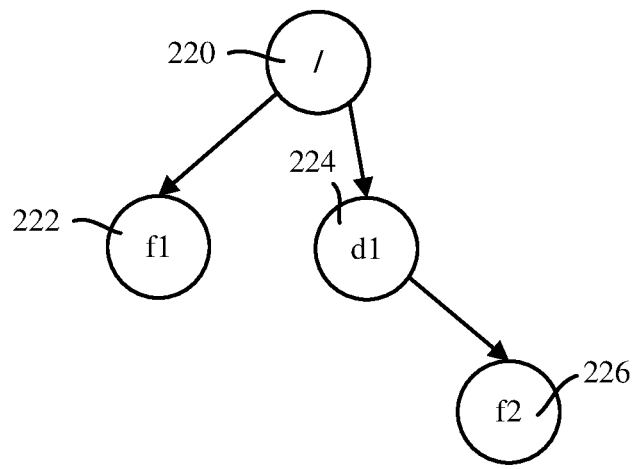
FIGS. 2A-2C are example representation of directories and files, including before a directory snapshot (FIG. 2A), after a directory snapshot (FIG. 2B) and after directory access (FIG. 2C), in accordance with various aspects and implementations of the subject disclosure.
Figure 2B:
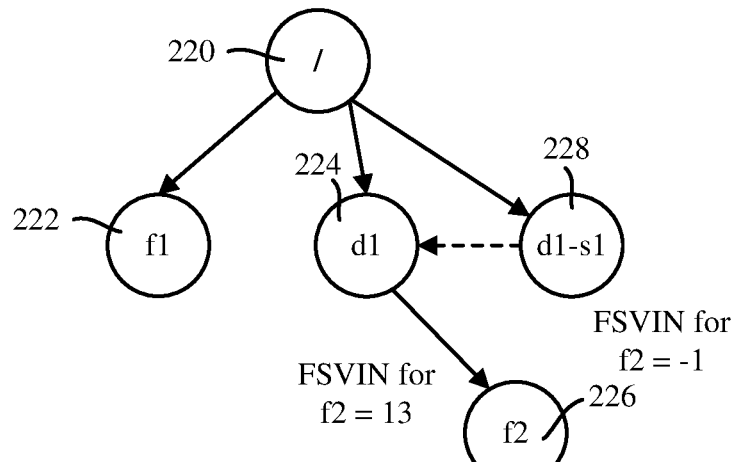
Figure 2C:
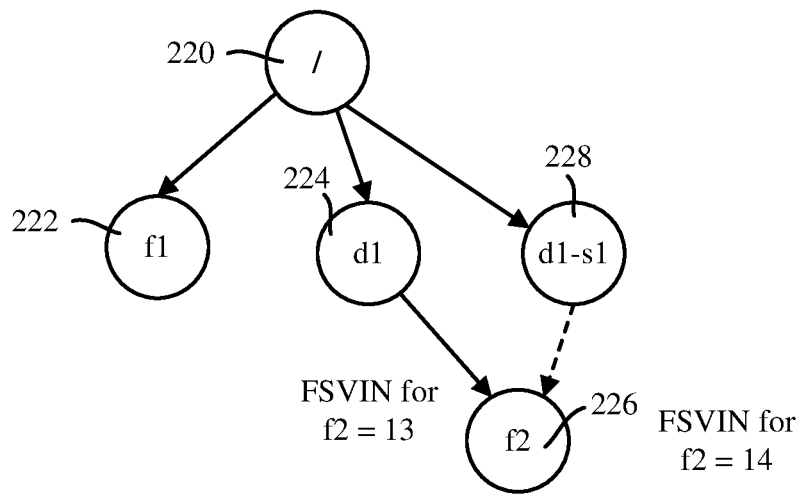

FIGS. 2A-2C generally show an example hierarchical structure of directories and files of a filesystem starting with a root directory ("/") 220. As can be seen in FIG. 2A, which represents a first state (FIG. 2A) prior to a directory snapshot being taken, within the filesystem root directory namespace, the root directory ("/") 220 is a direct hierarchical parent of a file ("f1") 222 and a directory ("d1") 224. In turn the directory ("d1") 224 is a direct hierarchical parent to a file ("f2") 226. The directory ("d1") 224 is to be snapshotted at a directory level (within the filesystem root directory namespace); note that a snapshot of the root directory is basically the same as a filesystem snapshot that creates different filesystem views at the filesystem level rather than the directory level, and is thus not described hereinafter.

FIG. 2B shows a later state after the snapshot of directory ("d1") 224 has been taken, resulting in a different available directory view, shown as directory ("d1-s1") 228. At this state represented in FIG. 2B and as described herein, the directory ("d1") 224 and the snapshotted directory ("d1-s1") 228 share the same underlying real inode file for the directory. Note that a filesystem virtual inode number (FSVIN), described below, is maintained for each file and directory, and in the example of FIG. 2B, is shown for the file f2 as equal to thirteen from the perspective of the view corresponding to the directory ("d1") 224, and (until directory ("d1-s1") 228 is accessed), as equal to minus one from the perspective of the view corresponding to the directory ("d1-s1") 228.

FIG. 2C shows a still later state after the directory ("d1-s1") 228 is accessed via a read or write operation. In this state, the filesystem virtual inode number for the file f2, from the perspective of the view corresponding to the directory ("d1-s1") 228, is given a real value, equal to fourteen in this example.

Figure 3:
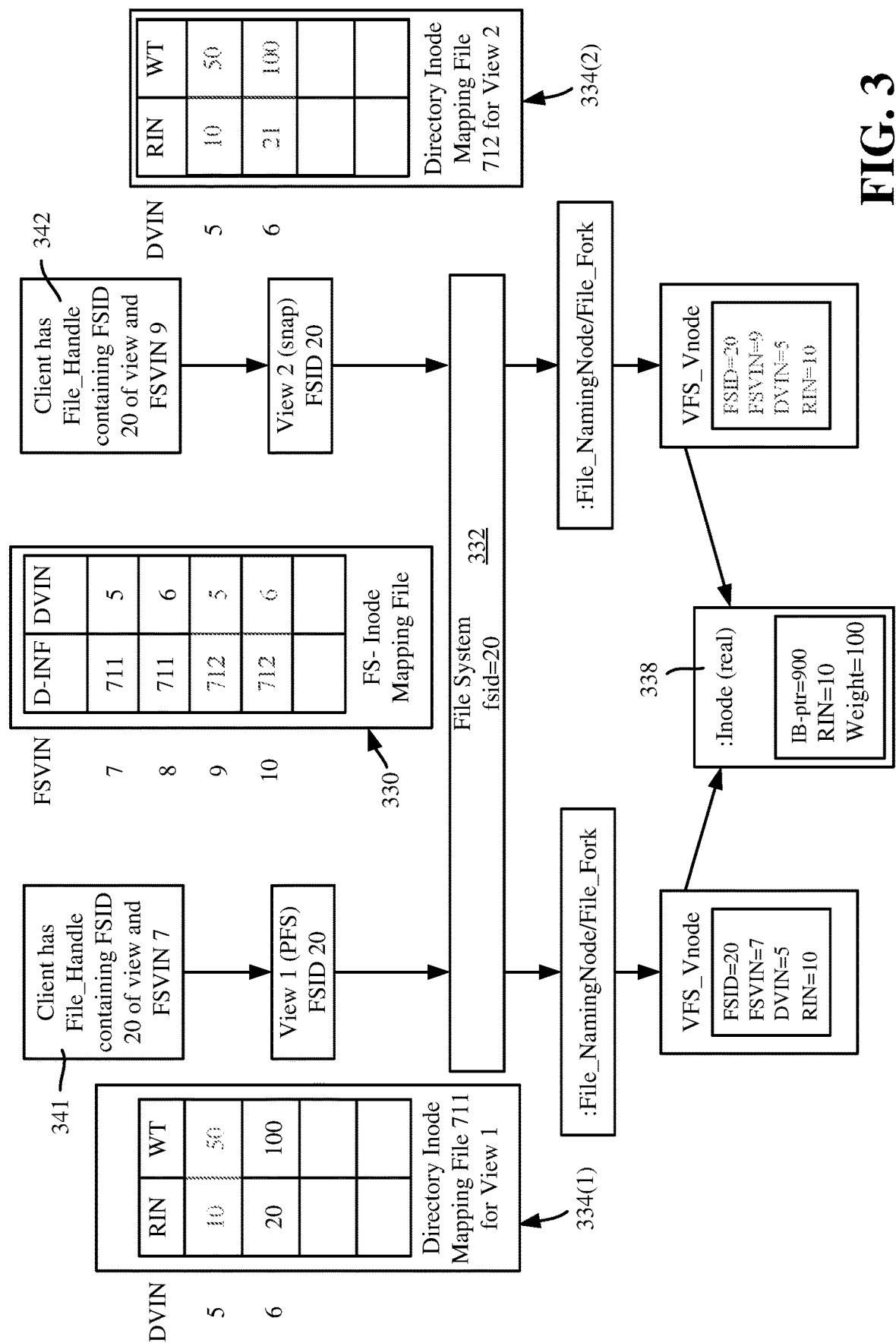
FIG. 3 is a representation of various data structures in a state before a modification to a directory that has been snapshotted, in accordance with various aspects and implementations of the subject disclosure.
Figure 4:
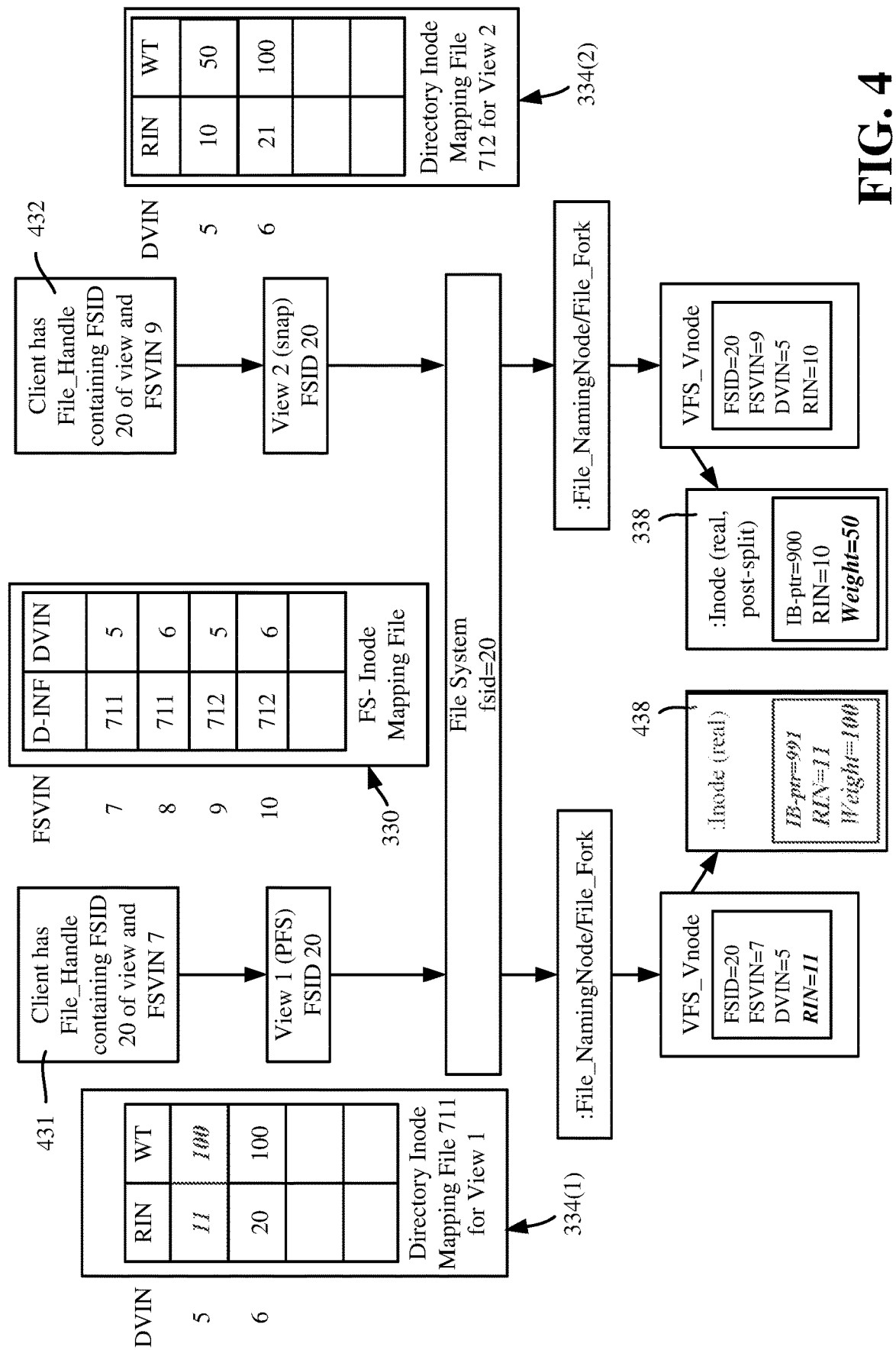
FIG. 4 is a representation of various data structures in a state after a modification to a directory that has been snapshotted results in splitting a directory inode, in accordance with various aspects and implementations of the subject disclosure.

FIGS. 3 and 4 show the concept of a directory snapshot from a dataflow/data structure perspective. In FIG. 3, a file system (FS) inode mapping file 330 for a file system with a file system identifier of twenty (fsid=20, block 332) tracks the global FS-virtual inode numbers (FSVINs) assigned to its directories (and files), including for directory snapshots. As shown in FIG. 3 the FS-inode mapping file 330 thus contains global filesystem-level metadata file that keeps a mapping from each FSVIN to a directory inode mapping file (D-INF) and its associated directory virtual inode number (DVIN). Note that in one or more implementations, an FSVIN associated with the FS-inode mapping file 330 is an index, and is not actually stored therein.

Thus, there are different types of virtual inode numbers (VINs) comprising the logical number of the file/directory that can be exported to clients, including an FSVIN for the global filesystem-level virtual inode number, and a DVIN for the local directory-level virtual inode number. In turn, the directory inode mapping file identified by a D-INF contains metadata that keeps a mapping from each virtual directory inode number to a real inode number (RIN, the physical inode number in inode space), along with a distributed weight value.

In the example of FIG. 3, a snapshot has been taken of a directory corresponding to a directory inode mapping file 334(1) with the directory inode mapping file 334(1) (identified in the FS-Inode mapping file 330) with FSVIN of 7 and identified with a D-INF value of 711. The directory inode mapping file 334(1) with the D-INF value of 711 contains metadata for two files or sub-directories, one (corresponding to FSVIN=7) with a directory VIN (DVIN) of 5, mapped to RIN 10 with distributed weight 50, and other (corresponding to FSVIN=8) with a directory VIN of 6, mapped to RIN 20 with distributed weight 100. Note that in one or more implementations, the DVIN is an index associated with a directory inode mapping file (e.g., 334(1) or 334(2)) and is not stored therein, (similar to the FSVINs associated with the FS-inode mapping file 330). In other locations, such as the directory itself, the DVIN and FSVIN are actually stored in the directory entry, e.g., FIGS. 5-8.

As can be seen, the FS-Inode mapping file 330 has been populated with metadata for the snapshot, namely an FSVIN of 9 which maps to the directory inode mapping file 334(2) with the D-INF value of 712 (allocated as part of the snapshot), and an FSVIN of 10 which also maps to the directory inode mapping file 334(2) with the D-INF value of 712. Because at the state shown in the example of FIG. 3 neither directory has been modified, the mapping contents in the directory inode mapping file 334(2) are the same as copied from the directory inode mapping file 334(1) as part of the snapshot operation.

Further, in the state shown in FIG. 3, both directory inode mapping files map to the same directory real inode (RIN=10) depicted via block 338. A client 341 accessing the original view of the directory mapped to the directory real inode (RIN=10) will do so via a file handle including the FSID of 20 and the FSVIN of 7; a client 342 accessing the snapshot view of the directory mapped to the same directory real inode (RIN=10) will do so via a file handle including the same FSID of 20 and the FSVIN of 9.

To summarize, when a directory snap is created, a new directory inode mapping file (snap) is created as a snap of the snapshotted directory's directory inode mapping file (original). This "create directory" snap operation thus allocates a new directory inode mapping file that shares the mappings copied from the original directory inode mapping file.

The first access of the snap directory (e.g., a read) populates the filesystem inode mapping file with new FSVINs based on the objects (subdirectories and files) of the new snap directory. Note that this could have been done as part of the snap operation, however there can be many such objects (e.g., on the order of millions), whereby the population of the filesystem inode mapping file is deferred until some actual access is needed (there may never be any client access). After the initial access, reads to either directory function as normal without any specific operations.

However, if a directory is modified (add, rename, delete or the like), the directory real inode needs to be split, otherwise the non-modified view would see the modified view's changed data, which would be incorrect. To this end, for the directory being modified, a new real inode is created with a new real inode number, with the modified directory inode mapping file updated with the new real inode number.

By way of example, consider a state shown in FIG. 4 (following the example state of FIG. 3) where a modification is to take place for the first time to the original directory. As can be seen in FIG. 4 by the shaded blocks of metadata and the bolded, italicized characters, a new real inode 438 is created with a new real inode number of eleven (RIN=11). The new real inode 438 points to a new indirect block pointer (IB-Ptr=991) and is initialized with a weight value of 100. Note that the sharing of the indirect blocks and RIN mappings between the directory and its snap is achieved through distributed weight based sharing as described below with reference to FIGS. 5-8. Note further that the weight value in the real inode 338 for the non-modified directory is reduced; prior to the split as in FIG. 3, the total weight in the pre-split inode file was 100, whereby the weights in the directory mapping files 334(1) and 334(2) were divided (50 and this example) so as to sum to 100. Following the split, the total weight in the directory real inode file 338 is reduced by the amount removed as part of the split operation, that is, the weight of 50 that was maintained in the directory inode mapping file 334(1) for view 1 is no longer part of and thus subtracted from the total weight in the directory real inode file 338, resulting in a new total weight of 50. Note that at this time there are no other snapshots, and thus the weight in the directory inode mapping file 334(1) for view 2 is the total weight in the directory real inode file 338.

Figure 5:
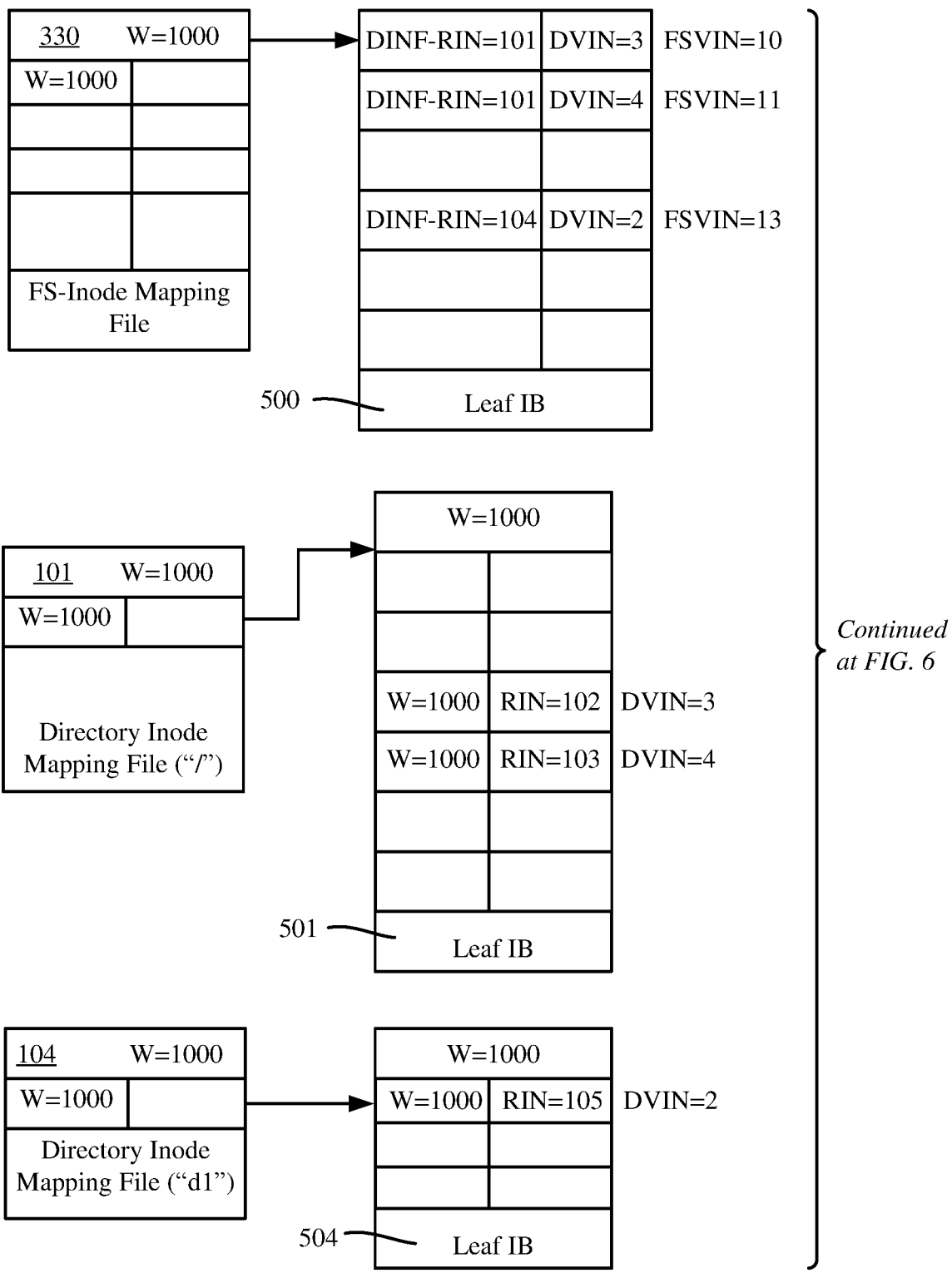
FIGS. 5 and 6 are representations of various data structures in a state prior to a directory snapshot, in accordance with various aspects and implementations of the subject disclosure.
Figure 6:
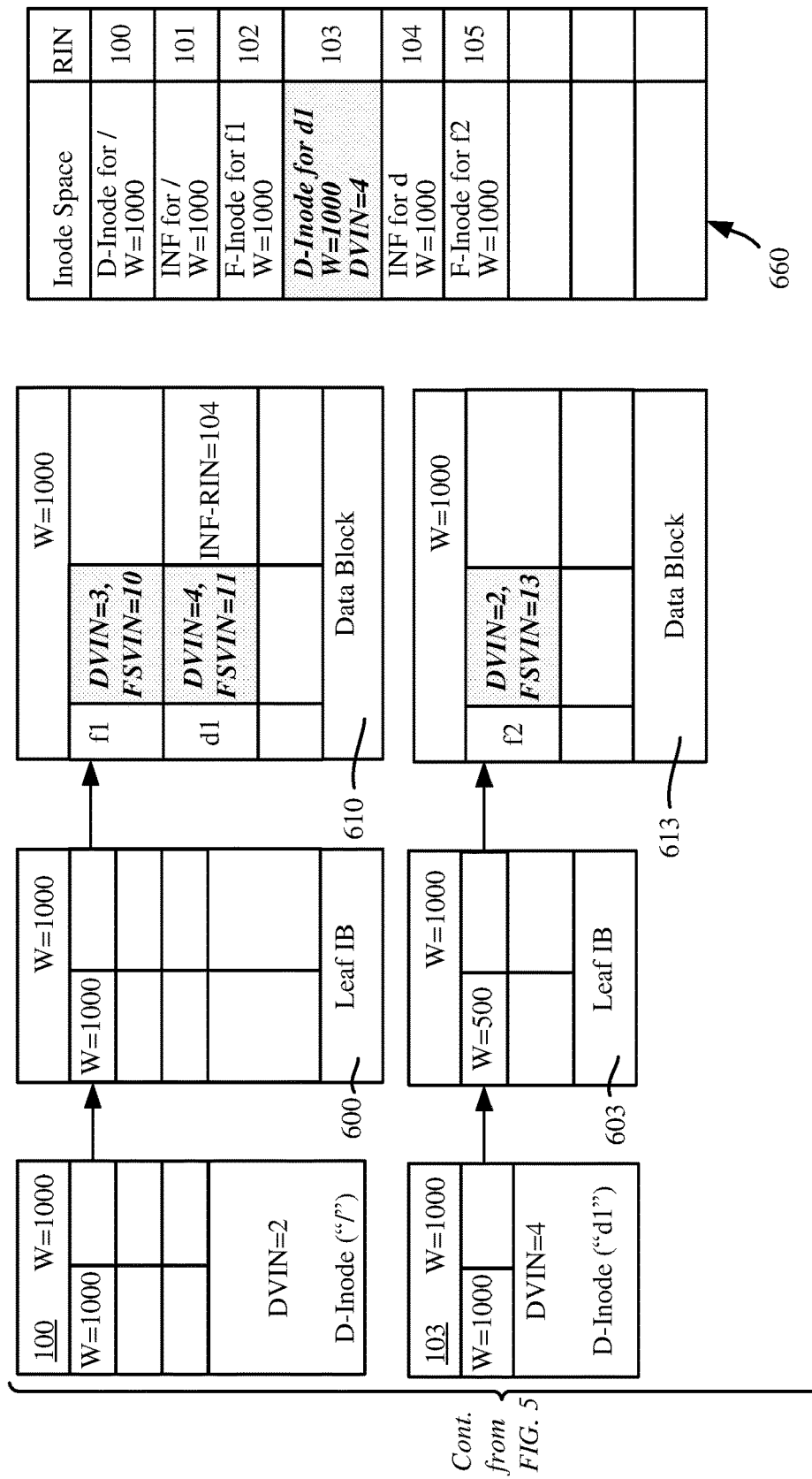
Figure 8:
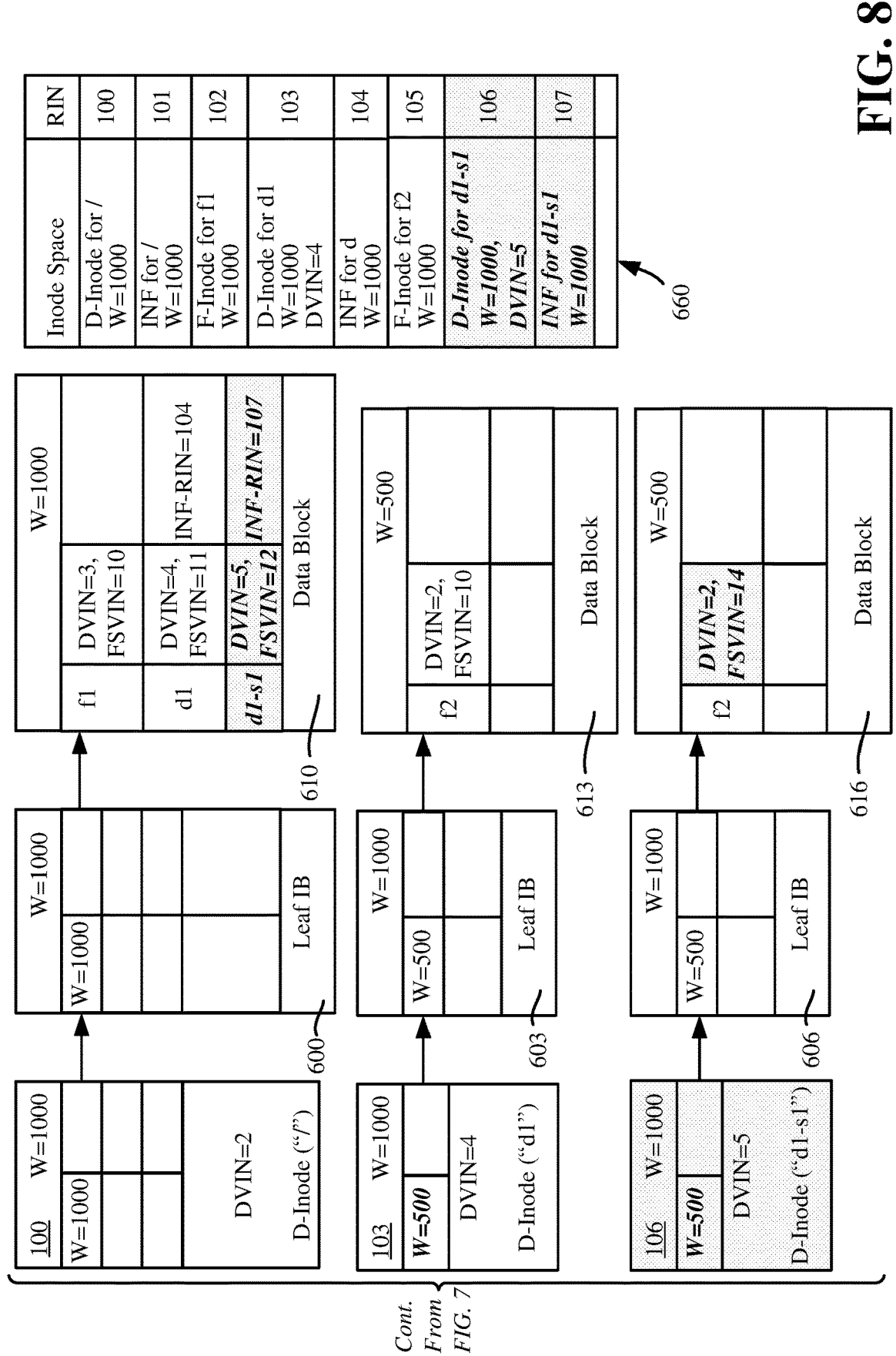

FIGS. 5 and 6 show additional examples of the data structure mappings and pointer relationships before a directory snapshot. FIGS. 7 and 8 show the additional examples after the directory snapshot. Note that in general, FIGS. 5 and 6 show the pre-snapshot state for directory ("d1"), and files ("f1") and ("f2") (e.g., of FIG. 2A), while FIGS. 7 and 8 show the post-snapshot state for the directory snapshot "d1-s1" taken from the directory ("d1") after some access of the directory snapshot "d1-s1" (e.g., of FIG. 2C). In FIGS. 5-8, recall that the FSVIN in the FS-inode mapping file 330 is an index, that is not stored therein, and similarly that the DVIN is an index in the directory inode mapping file (e.g., 101) and is not stored. However in other locations, including the directory itself, the DVIN and FSVIN are actually stored in the directory entry, for example.

In FIG. 5, the FS-inode mapping file 330 points to a leaf indirect block 500 that contains mappings for the root ("/") directory (DINF-RIN=101) and the "d1" directory beneath the root directory (DINF-RIN=104). Each mapping has an associated DVIN and FSVIN.

The directory inode mapping file (labeled 101) for the root ("/") directory points to a leaf indirect block 501 that associates weight values, real inode numbers and directory virtual inode numbers. Note that the real inode number (RIN=102) is for the real file inode of the file ("f1") directly under the root directory, and the real inode number (RIN=103) is for the directory real inode of the directory ("d1") directly under the root directory.

The directory inode mapping file 104 for the ("d1") directory points to a leaf indirect block 504 that associates weight value(s), real inode number(s) and directory virtual inode number(s). Note that the real inode number (RIN=105) is for the real file inode of the file ("f2") directly under the ("d1") directory.

In FIG. 6, the directory inode 100 for the root ("/") directory points to a leaf indirect block 600, which in turn points to a data block 610. The data block 610 contains the metadata for the direct child objects of the root ("/") directory, namely the file ("f1") with a DVIN of three and an FSVIN of ten, the directory ("d1") with a DVIN of four and an FSVIN of eleven along with the INF-RIN value equal to 104 (corresponding to block 104 of FIG. 5). The directory inode 103 for the ("d1") directory with a directory virtual inode number of four (DVIN=4) points to a leaf indirect block 603, which in turn points to a data block 613. The data block 613 contains the metadata for the (only) direct child object of the ("d1") directory, namely the file ("f2") with a DVIN of two and an FSVIN of thirteen.

Block 660 summarizes the pre-snapshot inode space, along with a current weight value and real inode number (RIN) for each directory inode and file inode.

In FIG. 5, the FS-inode mapping file 330 points to a leaf indirect block 500 that contains mappings for the root ("/") directory inode mapping file (DINF-RIN=101) and the "d1" directory beneath the root directory (DINF-RIN=104). Each mapping has an associated DVIN and FSVIN.

The directory inode mapping file (labeled 101) for the root ("/") directory points to a leaf indirect block 501 that associates weight values, real inode numbers and directory virtual inode numbers. Note that the real inode number (RIN=102) is for the real file inode of the file ("f1") directly under the root directory, and the real inode number (RIN=103) is for the directory real inode of the directory ("d1") directly under the root directory.

The directory inode mapping file 104 for the ("d1") directory points to a leaf indirect block 504 that associates weight value(s), real inode number(s) and directory virtual inode number(s). Note that the real inode number (RIN=105) is for the real file inode of the file ("f2") directly under the ("d1") directory.

In FIG. 6, the directory inode 100 for the root ("/") directory points to a leaf indirect block, which in turn points to a data block 610. The data block 610 contains the metadata for the direct child objects of the root ("/") directory, namely the file ("f1") with a DVIN of three and an FSVIN of ten, and directory ("d1") with a DVIN of four and an FSVIN of eleven along with the INF-RIN value equal to 104 (corresponding to block 104 of FIG. 5). The directory inode 103 for the ("d1") directory with a directory virtual inode number of four (DVIN=4) points to a leaf indirect block 603, which in turn points to a data block 613. The data block 613 contains the metadata for the (only) direct child object of the ("d1") directory, namely the file ("f2") with a DVIN of two and an FSVIN of thirteen.

Block 660 summarizes the pre-snapshot inode space, along with a current weight value and real inode number (RIN) for each directory inode and file inode.

FIGS. 7 and 8 show the data structures having been updated after the ("d1-s1") snapshot of the directory ("d1") has occurred (and ("d1-s1") has been accessed. Note that in addition to updating, two new data structures are created for the snapshot directory ("d1-s1"), namely directory inode mapping file 107 (FIG. 7) and for the directory inode file 106 (FIG. 8).

As can be seen in FIGS. 7 and 8, the data structure 500 is updated with the information corresponding to the ("d1-s1") directory snapshot. The data structure 500 for the root directory is updated with the value for the directory inode file 106 and its directory virtual inode number of five (DVIN=5). Note that the snapshot directory inode mapping file 107 points to the same leaf indirect block 504 as the original directory inode mapping file 104, as no inode split has occurred in this example state. Further note that the in FIG. 5 the pre-snapshot weight of the directory inode mapping file 104 was equal to 1000; however in the post-snapshot state depicted in FIG. 7, the weights of the directory inode mapping files 104 and 107 have been divided between them, summing to the same total weight of 1000 in the shared leaf indirect block 504.

In FIG. 7, the data structure 500 for the root directory is updated with the value for the directory inode file 106 and its directory virtual inode number of five (DVIN=5). Note that the snapshot directory inode mapping file 107 points to the same leaf indirect block 504 as the original directory inode mapping file 104, as no inode split has occurred in this example state.

In FIG. 8, the directory inode data structure 106 points to indirect block 606, which in turn points to a data block 616 containing the information for the snapshot file "f2"; (note that at this time, only the snapshot version's global FSVIN of fourteen is different from the original FSVIN of ten for the file "f2"). As can be seen, the data structure 610 is updated with the information corresponding to the ("d1-s1") directory snapshot, including the directory virtual inode number (DVIN=5), the global file system virtual inode number (FSVIN=12) and the value 107 for the directory real inode file 107 (FIG. 7). Further note that the pre-snapshot weight of the directory inode 103 of FIG. 5 (of 1000) has been divided to provide the post-snapshot weights of the directory inodes 103 and 106.

Block 660 in FIG. 8 summarizes the post-snapshot inode space, along with a current weight value and real inode number (RIN) for each directory inode and file inode. The real inode numbers of 106 and 107 have been assigned to the directory inode file 106 and the inode mapping file 107 that were allocated as part of the snapshot operation.

Figure 9:
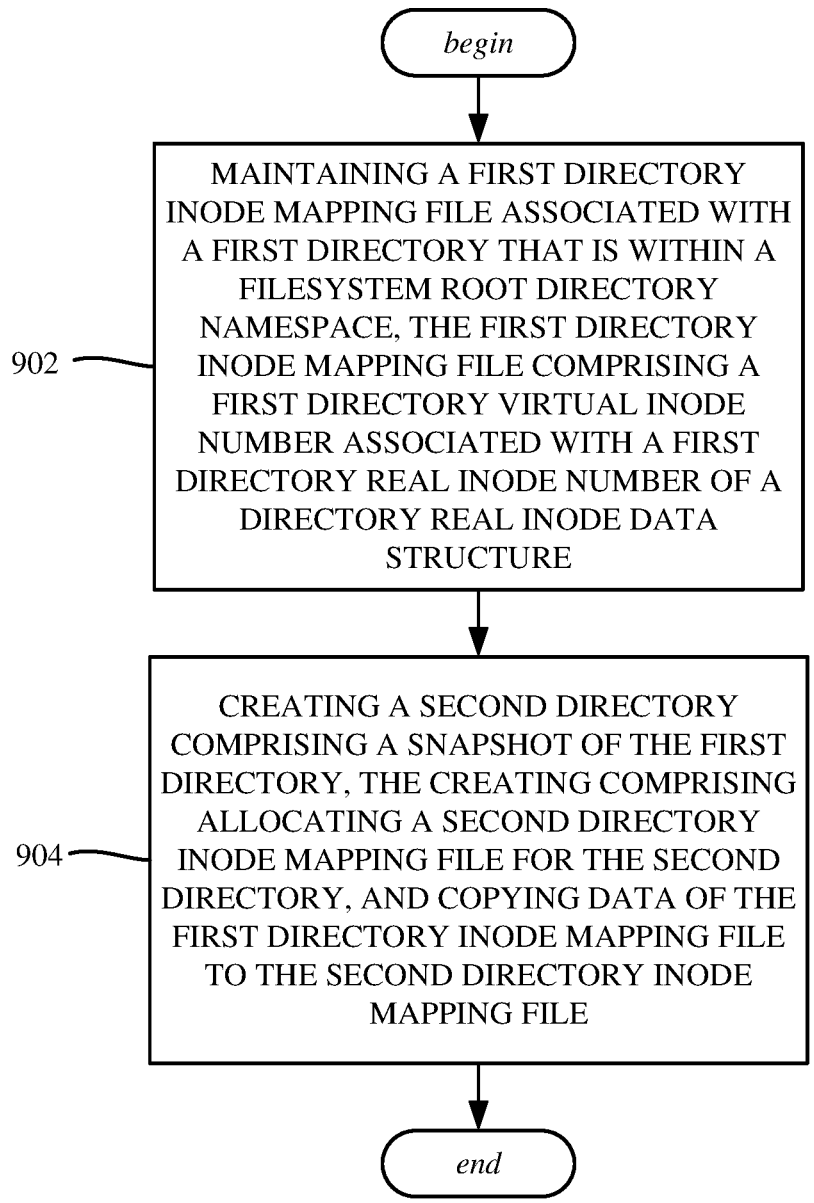
FIG. 9 is a flow diagram showing example operations related to creating a snapshot of a directory, in accordance with various aspects and implementations of the subject disclosure.

One or more aspects can be embodied in a system, such as represented in FIG. 9, and for example can comprise a memory that stores computer executable components and/or operations, and a processor that executes computer executable components and/or operations stored in the memory. Example operations can comprise operation 902, which represents maintaining a first directory inode mapping file associated with a first directory that is within a filesystem root directory namespace, the first directory inode mapping file comprising a first directory virtual inode number associated with a first directory real inode number of a directory real inode data structure. Operation 904 represents creating a second directory comprising a snapshot of the first directory, the creating comprising allocating a second directory inode mapping file for the second directory, and copying data of the first directory inode mapping file to the second directory inode mapping file.

Further operations can comprise updating a filesystem inode mapping file, which maps a first filesystem virtual inode number to the first directory inode mapping file and to the first directory virtual inode number, with a second filesystem virtual inode number that maps to the second directory inode mapping file and to the first directory virtual inode number.

Further operations can comprise detecting access to the second directory, which is a snapshot of the first directory, and, in response to detecting the access, populating a filesystem inode mapping file with entry data corresponding to one or more objects of the second directory.

Further operations can comprise detecting a requested modification to the first directory, and, in response to the detecting the requested modification, splitting the directory real inode data structure into a first directory real inode data structure for the first directory and a second directory real inode data structure for the second directory, the splitting comprising allocating the first directory real inode data structure, assigning a new directory real inode number for the first directory real inode data structure, and updating the first directory inode mapping file with the new directory real inode number for the first directory real inode data structure.

Further operations can comprise reducing a weight value in metadata of the second directory real inode based on a weight value entry in the first directory inode mapping file.

Further operations can comprise allocating a data block associated with the first directory real inode data structure, and adding, to metadata of the first directory real inode data structure, a pointer to the data block.

Further operations can comprise initializing metadata of the first directory real inode data structure with an initial weight value, and updating a weight value entry associated with the new directory real inode number in the first directory inode mapping file based on the initial weight value.

Detecting the requested modification to the first directory can comprise detecting a pending subdirectory modification within a namespace of the first directory.

Figure 10:
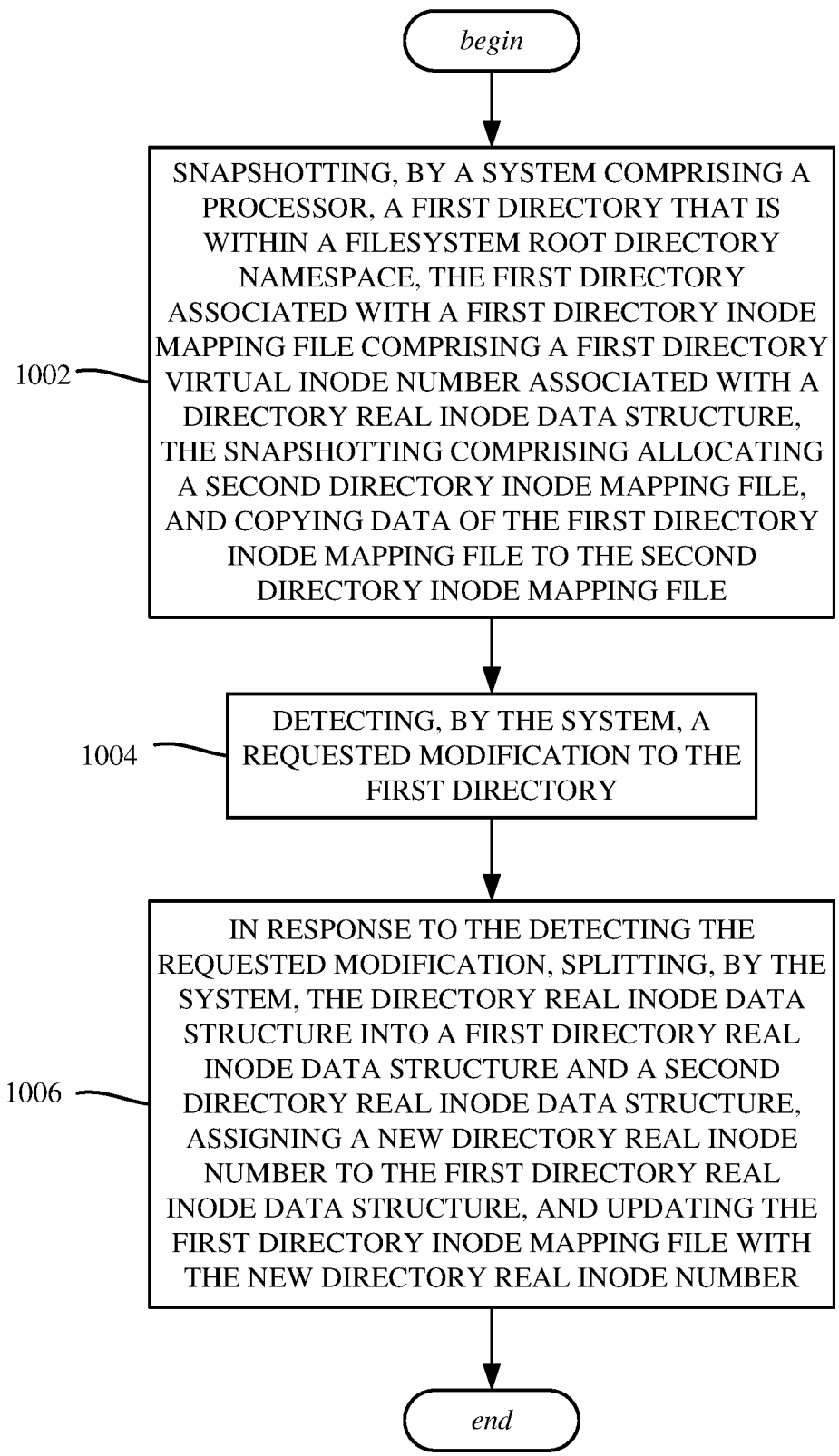
FIG. 10 is a flow diagram showing example operations related to snapshotting a first directory to provide a second directory copy, and handling a request to modify the first directory by splitting a directory inode data structure, in accordance with various aspects and implementations of the subject disclosure.

One or more aspects can be embodied in a system/method, such as represented in FIG. 10, and for example can comprise operations of a method. Example operations can comprise operation 1002, which represents snapshotting, by a system comprising a processor, a first directory that is within a filesystem root directory namespace, the first directory associated with a first directory inode mapping file comprising a first directory virtual inode number associated with a directory real inode data structure, the snapshotting comprising allocating a second directory inode mapping file, and copying data of the first directory inode mapping file to the second directory inode mapping file. Operation 904 represents detecting, by the system, a requested modification to the first directory. Operation 906 represents, in response to the detecting the requested modification, splitting, by the system, the directory real inode data structure into a first directory real inode data structure and a second directory real inode data structure, assigning a new directory real inode number to the first directory real inode data structure, and updating the first directory inode mapping file with the new directory real inode number.

Operations can comprise updating, by the system, a filesystem inode mapping file, which maps a first filesystem virtual inode number to the first directory inode mapping file and to the first directory virtual inode number, with a second filesystem virtual inode number that maps to the second directory inode mapping file and to the first directory virtual inode number.

Operations can comprise detecting, by the system, access to the second directory, which is a snapshot of the first directory, and, in response to detecting the access, populating, by the system, the filesystem inode mapping file with entry data corresponding to one or more objects of the second directory.

Operations can comprise reducing, by the system, a weight value in metadata of the second directory real inode based on a weight value entry in the first directory inode mapping file.

Operations can comprise allocating, by the system, a data block associated with the first directory real inode data structure, and adding, by the system, to metadata of the first directory real inode data structure, a pointer to the data block.

Operations can comprise initializing, by the system, metadata of the first directory real inode data structure with an initial weight value, and updating, by the system, a weight value entry associated with the new directory real inode number in the first directory inode mapping file based on the initial weight value.

Detecting the requested modification to the first directory comprises detecting a pending subdirectory modification within a namespace of the first directory.

Figure 11:
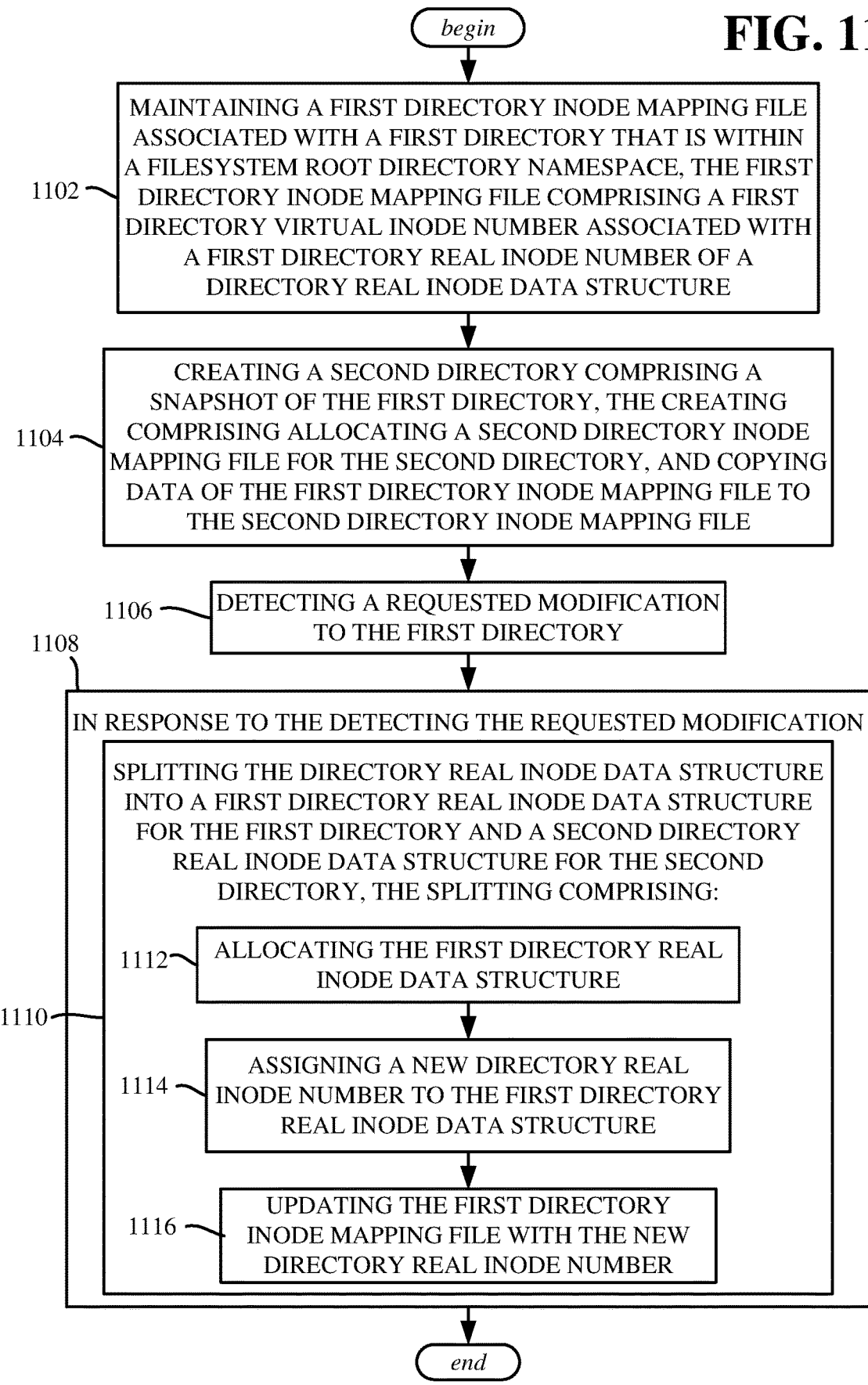
FIG. 11 is a flow diagram showing example operations related to creating a snapshot of a first directory, and handling a request to modify the first directory in accordance with various aspects and implementations of the subject disclosure.

FIG. 11 summarize various example operations, e.g., corresponding to a machine-readable storage medium, comprising executable instructions that, when executed by a processor, facilitate performance of operations. Operation 1102 represents maintaining a first directory inode mapping file associated with a first directory that is within a filesystem root directory namespace, the first directory inode mapping file comprising a first directory virtual inode number associated with a first directory real inode number of a directory real inode data structure. Operation 1104 represents creating a second directory comprising a snapshot of the first directory, the creating comprising allocating a second directory inode mapping file for the second directory, and copying data of the first directory inode mapping file to the second directory inode mapping file. Operation 1106 represents detecting a requested modification to the first directory. Operation 1108 represents, in response to the detecting the requested modification, splitting the directory real inode data structure into a first directory real inode data structure for the first directory and a second directory real inode data structure for the second directory (operation 1110). The splitting can comprise allocating the first directory real inode data structure (operation 1112), assigning a new directory real inode number to the first directory real inode data structure (operation 1114), and updating the first directory inode mapping file with the new directory real inode number (operation 1116).

Further operations can comprise updating a filesystem inode mapping file, which maps a first filesystem virtual inode number to the first directory inode mapping file and to the first directory virtual inode number, with a second filesystem virtual inode number that maps to the second directory inode mapping file and to the first directory virtual inode number, detecting access to the second directory, which is a snapshot of the first directory, and, in response to detecting the access, populating the filesystem inode mapping file with entry data corresponding to one or more objects of the second directory.

Further operations can comprise, reducing a weight value in metadata of the second directory real inode based on a weight value entry in the first directory inode mapping file, changing the weight value entry in the first directory inode mapping file to an initial weight value, and initializing the first directory real inode data structure with the initial weight value.

Further operations can comprise allocating a data block associated with the first directory real inode data structure, and adding a data block reference to the first directory real inode data structure.

Detecting the requested modification to the first directory comprises detecting a pending subdirectory modification within a namespace of the first directory.

As can be seen, described herein is a technology that facilitates directory-level snapshots. A modification to a directory results in a directory inode split operation to provide separate views of the modified and unmodified directories.

Figure 12:
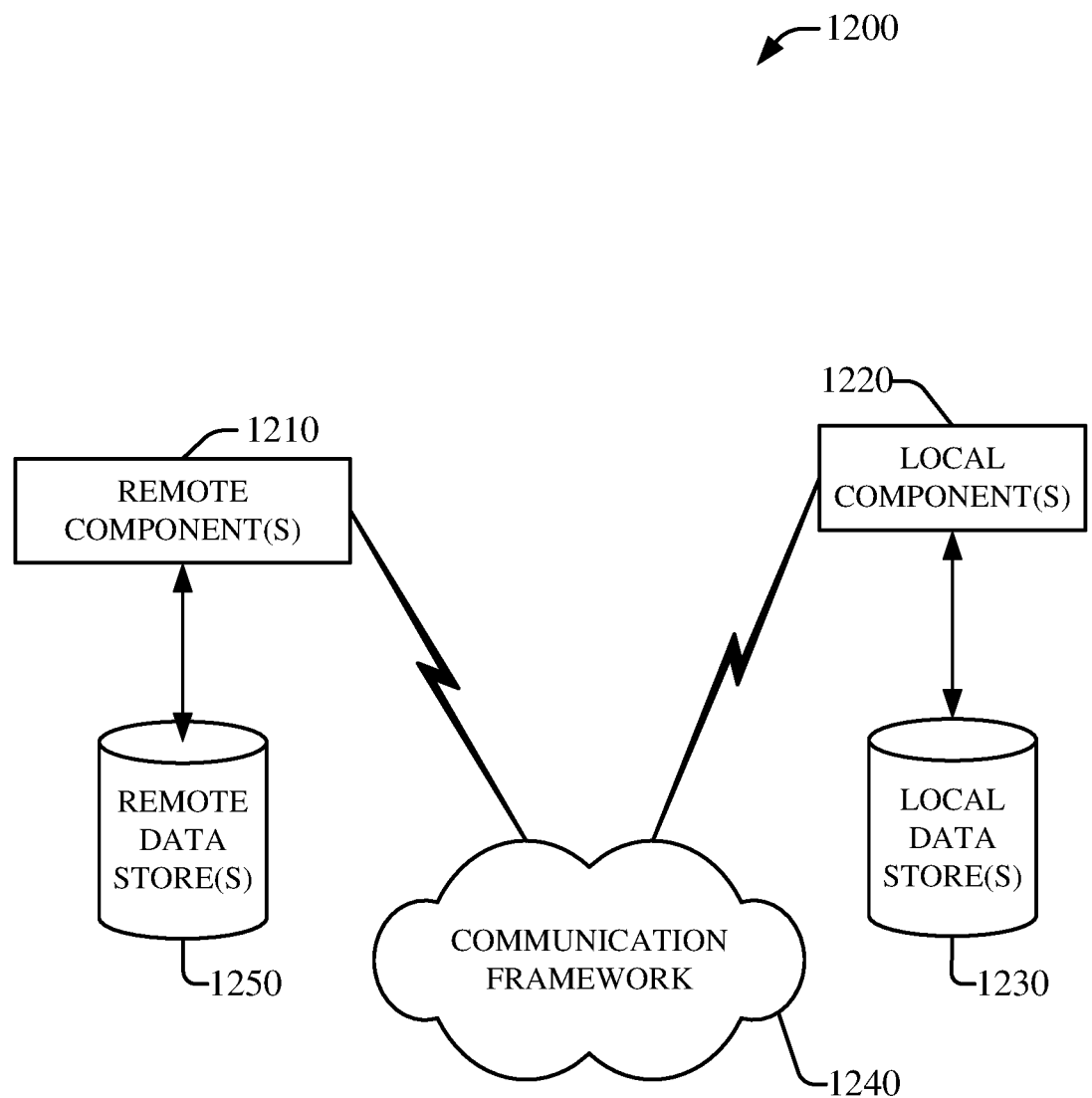
FIG. 12 is a block diagram representing an example computing environment into which aspects of the subject matter described herein may be incorporated.

FIG. 12 is a schematic block diagram of a computing environment 1200 with which the disclosed subject matter can interact. The system 1200 comprises one or more remote component(s) 1210. The remote component(s) 1210 can be hardware and/or software (e.g., threads, processes, computing devices). In some embodiments, remote component(s) 1210 can be a distributed computer system, connected to a local automatic scaling component and/or programs that use the resources of a distributed computer system, via communication framework 1240. Communication framework 1240 can comprise wired network devices, wireless network devices, mobile devices, wearable devices, radio access network devices, gateway devices, femtocell devices, servers, etc.

The system 1200 also comprises one or more local component(s) 1220. The local component(s) 1220 can be hardware and/or software (e.g., threads, processes, computing devices). In some embodiments, local component(s) 1220 can comprise an automatic scaling component and/or programs that communicate/use the remote resources 1210 and 1220, etc., connected to a remotely located distributed computing system via communication framework 1240.

One possible communication between a remote component(s) 1210 and a local component(s) 1220 can be in the form of a data packet adapted to be transmitted between two or more computer processes. Another possible communication between a remote component(s) 1210 and a local component(s) 1220 can be in the form of circuit-switched data adapted to be transmitted between two or more computer processes in radio time slots. The system 1200 comprises a communication framework 1240 that can be employed to facilitate communications between the remote component(s) 1210 and the local component(s) 1220, and can comprise an air interface, e.g., Uu interface of a UMTS network, via a long-term evolution (LTE) network, etc. Remote component(s) 1210 can be operably connected to one or more remote data store(s) 1250, such as a hard drive, solid state drive, SIM card, device memory, etc., that can be employed to store information on the remote component(s) 1210 side of communication framework 1240. Similarly, local component(s) 1220 can be operably connected to one or more local data store(s) 1230, that can be employed to store information on the local component(s) 1220 side of communication framework 1240.

Figure 13:
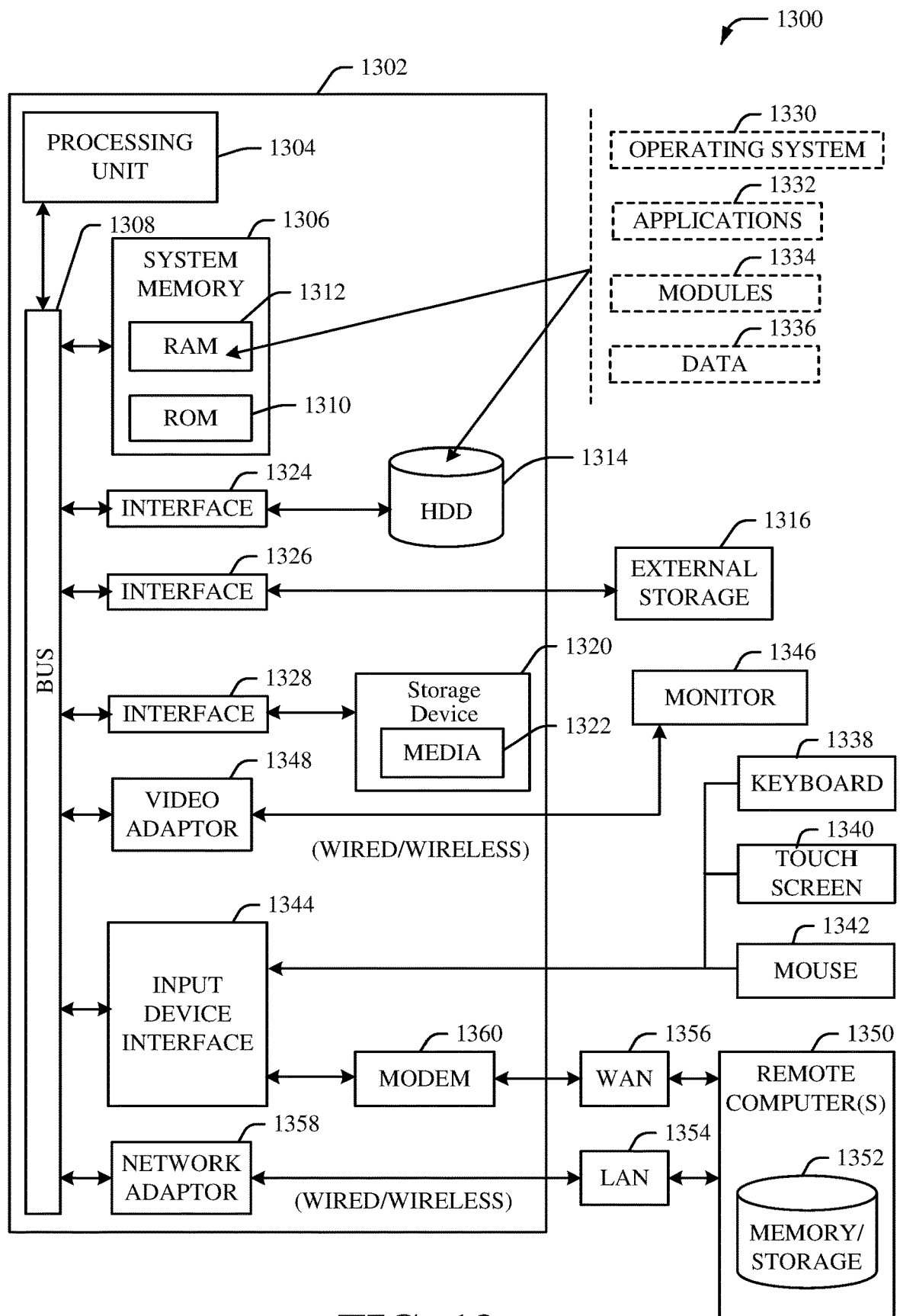
FIG. 13 depicts an example schematic block diagram of a computing environment with which the disclosed subject matter can interact/be implemented at least in part, in accordance with various aspects and implementations of the subject disclosure.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), and can include one or more external storage devices 1316 (e.g., a magnetic floppy disk drive (FDD) 1316, a memory stick or flash drive reader, a memory card reader, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314.

Other internal or external storage can include at least one other storage device 1320 with storage media 1322 (e.g., a solid state storage device, a nonvolatile memory device, and/or an optical disk drive that can read or write from removable media such as a CD-ROM disc, a DVD, a BD, etc.). The external storage 1316 can be facilitated by a network virtual machine. The HDD 1314, external storage device(s) 1316 and storage device (e.g., drive) 1320 can be connected to the system bus 1308 by an HDD interface 1324, an external storage interface 1326 and a drive interface 1328, respectively.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
  maintaining a first directory inode mapping file associated with a first directory that is within a filesystem root directory namespace, the first directory inode mapping file comprising a first directory virtual inode number associated with a first directory real inode number of a directory real inode data structure; and
  creating a second directory comprising a snapshot of the first directory, the creating comprising allocating a second directory inode mapping file for the second directory, and copying data of the first directory inode mapping file to the second directory inode mapping file;
  detecting a requested modification to the first directory; and
  in response to the detecting the requested modification, splitting the directory real inode data structure into a first directory real inode data structure for the first directory and a second directory real inode data structure for the second directory, the splitting comprising allocating the first directory real inode data structure, assigning a new directory real inode number for the first directory real inode data structure, and updating the first directory inode mapping file with the new directory real inode number for the first directory real inode data structure.

2. The system of claim 1, wherein the operations further comprise updating a filesystem inode mapping file, which maps a first filesystem virtual inode number to the first directory inode mapping file and to the first directory virtual inode number, with a second filesystem virtual inode number that maps to the second directory inode mapping file and to the first directory virtual inode number.

3. The system of claim 1, wherein the operations further comprise detecting access to the second directory, and, in response to detecting the access, populating a filesystem inode mapping file with entry data corresponding to one or more objects of the second directory.

4. The system of claim 1, wherein the operations further comprise reducing a weight value in metadata of the second directory real inode based on a weight value entry in the first directory inode mapping file.

5. The system of claim 1, wherein the operations further comprise allocating a data block associated with the first directory real inode data structure, and adding, to metadata of the first directory real inode data structure, a pointer to the data block.

6. The system of claim 1, wherein the operations further comprise initializing metadata of the first directory real inode data structure with an initial weight value, and updating a weight value entry associated with the new directory real inode number in the first directory inode mapping file based on the initial weight value.

7. The system of claim 1, wherein the detecting the requested modification to the first directory comprises detecting a pending subdirectory modification within a namespace of the first directory.

8. A method comprising:
snapshotting, by a system comprising a processor, a first directory that is within a filesystem root directory namespace, the first directory associated with a first directory inode mapping file comprising a first directory virtual inode number associated with a directory real inode data structure, the snapshotting comprising allocating a second directory inode mapping file, and copying data of the first directory inode mapping file to the second directory inode mapping file;
detecting, by the system, a requested modification to the first directory; and
in response to the detecting the requested modification, splitting, by the system, the directory real inode data structure into a first directory real inode data structure and a second directory real inode data structure, assigning a new directory real inode number to the first directory real inode data structure, and updating the first directory inode mapping file with the new directory real inode number.

9. The method of claim 8, further comprising updating, by the system, a filesystem inode mapping file, which maps a first filesystem virtual inode number to the first directory inode mapping file and to the first directory virtual inode number, with a second filesystem virtual inode number that maps to the second directory inode mapping file and to the first directory virtual inode number.

10. The method of claim 9, further comprising detecting, by the system, access to the second directory, and, in response to detecting the access, populating, by the system, the filesystem inode mapping file with entry data corresponding to one or more objects of the second directory.

11. The method of claim 8, further comprising reducing, by the system, a weight value in metadata of the second directory real inode based on a weight value entry in the first directory inode mapping file.

12. The method of claim 8, further comprising allocating, by the system, a data block associated with the first directory real inode data structure, and adding, by the system, to metadata of the first directory real inode data structure, a pointer to the data block.

13. The method of claim 8, further comprising initializing, by the system, metadata of the first directory real inode data structure with an initial weight value, and updating, by the system, a weight value entry associated with the new directory real inode number in the first directory inode mapping file based on the initial weight value.

14. The method of claim 8, wherein the detecting the requested modification to the first directory comprises detecting a pending subdirectory modification within a namespace of the first directory.

15. A non-transitory machine-readable medium, comprising executable instructions that, when executed by a processor, facilitate performance of operations, the operations comprising:
maintaining a first directory inode mapping file associated with a first directory that is within a filesystem root directory namespace, the first directory inode mapping file comprising a first directory virtual inode number associated with a first directory real inode number of a directory real inode data structure;
creating a second directory comprising a snapshot of the first directory, the creating comprising allocating a second directory inode mapping file for the second directory, and copying data of the first directory inode mapping file to the second directory inode mapping file;
detecting a requested modification to the first directory; and
in response to the detecting the requested modification:
splitting the directory real inode data structure into a first directory real inode data structure for the first directory and a second directory real inode data structure for the second directory, the splitting comprising:
allocating the first directory real inode data structure,
assigning a new directory real inode number to the first directory real inode data structure, and
updating the first directory inode mapping file with the new directory real inode number.

16. The non-transitory machine-readable medium of claim 15, wherein the operations further comprise updating a filesystem inode mapping file, which maps a first filesystem virtual inode number to the first directory inode mapping file and to the first directory virtual inode number, with a second filesystem virtual inode number that maps to the second directory inode mapping file and to the first directory virtual inode number, detecting access to the second directory, and, in response to detecting the access, populating the filesystem inode mapping file with entry data corresponding to one or more objects of the second directory.

17. The non-transitory machine-readable medium of claim 15, wherein the operations further comprise reducing a weight value in metadata of the second directory real inode based on a weight value entry in the first directory inode mapping file, changing the weight value entry in the first directory inode mapping file to an initial weight value, and initializing the first directory real inode data structure with the initial weight value.

18. The non-transitory machine-readable medium of claim 15, wherein the operations further comprise allocating a data block associated with the first directory real inode data structure, and adding a data block reference to the first directory real inode data structure.

19. The non-transitory machine-readable medium of claim 15, wherein the detecting the requested modification to the first directory comprises detecting a pending subdirectory modification within a namespace of the first directory.

20. The non-transitory machine-readable medium of claim 15, wherein the operations further comprise initializing metadata of the first directory real inode data structure with an initial weight value, and updating a weight value entry associated with the new directory real inode number in the first directory inode mapping file based on the initial weight value.

* * * * *